US010367373B2

(12) United States Patent
Boyd (10) Patent No.: US 10,367,373 B2
(45) Date of Patent: *Jul. 30, 2019

(54) MOBILE CART AND POWER SYSTEM THEREFOR

(71) Applicant: Scott-Clark, L.P., Burnet, TX (US)

(72) Inventor: James S Boyd, Horshehoe Bay, TX (US)

(73) Assignee: Scott-Clark, L.P., Burnet, TX (US)

( * ) Notice: Subject to any disclaimer, the term of this patent is extended or adjusted under 35 U.S.C. 154(b) by 275 days.

This patent is subject to a terminal disclaimer.

(21) Appl. No.: 15/205,677

(22) Filed: Jul. 8, 2016

(65) Prior Publication Data

US 2017/0005512 A1    Jan. 5, 2017

Related U.S. Application Data

(63) Continuation of application No. 13/872,640, filed on Apr. 29, 2013, now Pat. No. 9,705,359.

(51) Int. Cl.
*H02J 9/06* (2006.01)
*H02J 7/00* (2006.01)
(Continued)

(52) U.S. Cl.
CPC .......... *H02J 9/061* (2013.01); *H01M 2/1005* (2013.01); *H01M 2/1083* (2013.01); *H01M 10/0525* (2013.01); *H01M 10/441* (2013.01); *H02J 7/0013* (2013.01); *H02J 7/0045* (2013.01); *H02J 7/0052* (2013.01);
(Continued)

(58) Field of Classification Search
CPC ............. H01M 10/441; H01M 10/446; H01M 10/482; H01M 10/651; H01M 2010/4271; H01M 2010/4278
See application file for complete search history.

(56) References Cited

U.S. PATENT DOCUMENTS

| | | | | |
|---|---|---|---|---|
| 4,849,682 A | * | 7/1989 | Bauer | .................. H02J 7/0004 320/106 |
| 5,818,200 A | | 10/1998 | Cummings et al. | |

(Continued)

FOREIGN PATENT DOCUMENTS

| | | |
|---|---|---|
| WO | WO 2009/108301 | 9/2009 |
| WO | WO 2012/078676 | 6/2012 |

OTHER PUBLICATIONS

The International Search Report and Written Opinoin of the International Searching Authority for PCT/US2013/038640, dated completed Aug. 14, 2013 and dated Aug. 23, 2013.

(Continued)

*Primary Examiner* — Jared Fureman
*Assistant Examiner* — Michael J Warmflash
(74) *Attorney, Agent, or Firm* — Miller Canfield Paddock and Stone; Mark L Maki (57) ABSTRACT

A mobile cart has a battery assembly, which includes an on-board charger for selectively recharging one or more batteries to ensure constant operation of the powered equipment provided on the cart. The battery assembly possesses a removable battery configuration and is operated by a Battery Control System (BCS). The BCS is an intelligent control system for removable batteries and battery cell packs to provide an improved system of charging and discharging the individual batteries.

18 Claims, 6 Drawing Sheets

(51) Int. Cl.
*H02J 9/04* (2006.01)
*H01M 2/10* (2006.01)
*H01M 10/44* (2006.01)
*H01M 10/0525* (2010.01)
*H01M 10/42* (2006.01)

(52) U.S. Cl.
CPC .............. *H02J 7/0063* (2013.01); *H02J 9/04* (2013.01); *H01M 2010/4271* (2013.01); *H02J 7/0021* (2013.01); *H02J 7/0068* (2013.01); *H02J 7/0073* (2013.01); *H02J 2007/0067* (2013.01); *Y10T 307/344* (2015.04)

(56) References Cited

U.S. PATENT DOCUMENTS

| | | | |
|---|---|---|---|
| 7,782,607 B2 | 8/2010 | Harbin et al. | |
| 7,800,255 B2 | 9/2010 | Coonan et al. | |
| 7,830,668 B2 | 11/2010 | Coonan et al. | |
| 7,839,121 B2 | 11/2010 | Kim | |
| 7,855,530 B2 | 12/2010 | Coonan et al. | |
| 8,169,191 B2 | 5/2012 | Werthman et al. | |
| 8,180,485 B2* | 5/2012 | Reckelhoff | A61G 12/001 700/242 |
| 8,338,985 B2 | 12/2012 | Murtha et al. | |
| 2004/0174142 A1* | 9/2004 | Olson | H02J 7/0013 320/135 |
| 2005/0001593 A1 | 1/2005 | Kawasumi et al. | |
| 2007/0024246 A1 | 2/2007 | Flaugher | |
| 2007/0228680 A1* | 10/2007 | Reppert | A47B 21/00 280/47.35 |
| 2007/0262641 A1 | 11/2007 | Stone | |
| 2008/0110460 A1 | 5/2008 | Elaz et al. | |
| 2009/0212744 A1 | 8/2009 | Werthman et al. | |
| 2010/0156184 A1* | 6/2010 | Ludtke | G01R 31/3606 307/66 |
| 2010/0264738 A1* | 10/2010 | Murtha | G06F 1/263 307/66 |
| 2010/0264874 A1 | 10/2010 | Murtha et al. | |
| 2012/0203377 A1* | 8/2012 | Paydar | G01K 3/005 700/232 |
| 2012/0245731 A1 | 9/2012 | Reckelhoff | |

OTHER PUBLICATIONS

European Search Report dated Feb. 12, 2016, for European application No. 13782021.3.

* cited by examiner

MOBILE CART AND POWER SYSTEM THEREFOR

CROSS REFERENCE TO RELATED APPLICATIONS

This application is a continuation of U.S. patent application Ser. No. 13/872,640, filed Apr. 29, 2016, which claims priority from provisional application 61/639,283, filed on Apr. 27, 2012, which applications are incorporated herein by reference.

FIELD OF THE INVENTION

The invention relates to a mobile cart having powered medical equipment and other non-medical systems for use in healthcare and other non-medical environments, and more particularly, to a mobile cart having an advanced battery power system for powering medical and non-medical equipment on the cart.

BACKGROUND OF THE INVENTION

Mobile computing carts are used in healthcare environments and are commonly equipped with rechargeable batteries for extended operation. The batteries may be fixed on the cart with a charger and control mechanism for safety, charge status and other reasons. Mobile computing carts are often used in healthcare environments but also are used in non-healthcare fields and environments.

For example, such mobile computing carts can include computers thereon including a processor, keyboard and display. Other electrical equipment might also be provided if desired. In one configuration, the computers can be used to access and update patient records for a mobile cart used in a healthcare facility such as a hospital.

In another configuration, a hospital may dispense medications using a mobile cart with several drawers, each holding the medication assigned to one patient or assigned to multiple patients. The mobile cart might be periodically reloaded with medications and used by a caregiver to conveniently dispense medications to these patients. These drawers can have electronic locks controlled by the onboard computer to selectively open and close the drawers.

The present invention relates to improvements in mobile computer cart power systems and their use.

More particularly, the invention relates to a mobile cart having a battery assembly, which includes an on-board charger for selectively recharging one or more batteries to ensure constant operation of the powered equipment provided on the cart. Batteries on computer carts may be fixed in place and coupled to an on-board charger or be removable for charging. The present invention improves a removable battery configuration and its operation with a Battery Control System (BCS). The BCS is an intelligent control system for removable batteries and battery cell packs. Some mobile computer carts' operation might be best served with periodic stationary events during which the batteries can be recharged while still on the cart. In other cases the carts are used in a workflow that does not present these stationary opportunities or in the alternative, users choose to swap batteries. In yet other cases, these practices are mixed.

The power system described includes a power controller or controllers comprising a BCS. This improves existing art by managing, monitoring and controlling the batteries and an optional charger and reporting on actions, conditions and alerts. The BCS might protect each battery from harmful crossing current between or among the batteries. The BCS might select the battery to be used at any time for powering the cart or receiving a recharge. The BCS might provide monitoring of the health of the batteries, their services histories, serial numbers, charge status, remaining service life and other information. The BCS might advertise its readings or conditions by lit or flashing lights or audible signals or by relaying information to the computer on the cart, a central monitoring server or other remote or local entity. The BCS might intervene and prevent a battery from use or monitor temperature of the batteries or environment. The BCS might select a battery for current use on the cart, use both simultaneously or manage removal and insertion of battery safely and without output interruption. The selection methods employed might be configurable by switches or software configuration changes. The BCS might display or transmit the status of battery charging, discharging, flow of energy or other information. The BCS might derive information by communication with batteries that are able to provide useful information. This might include notice of internal battery failures, temperature, charge and recharge conditions and status, serial number or other identifying information and event histories. The BCS might store information internally or report it out to a computer on the mobile cart or a central database.

Other objects and purposes of the invention, and variations thereof, will be apparent upon reading the following specification and inspecting the accompanying drawings.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Figure 1:
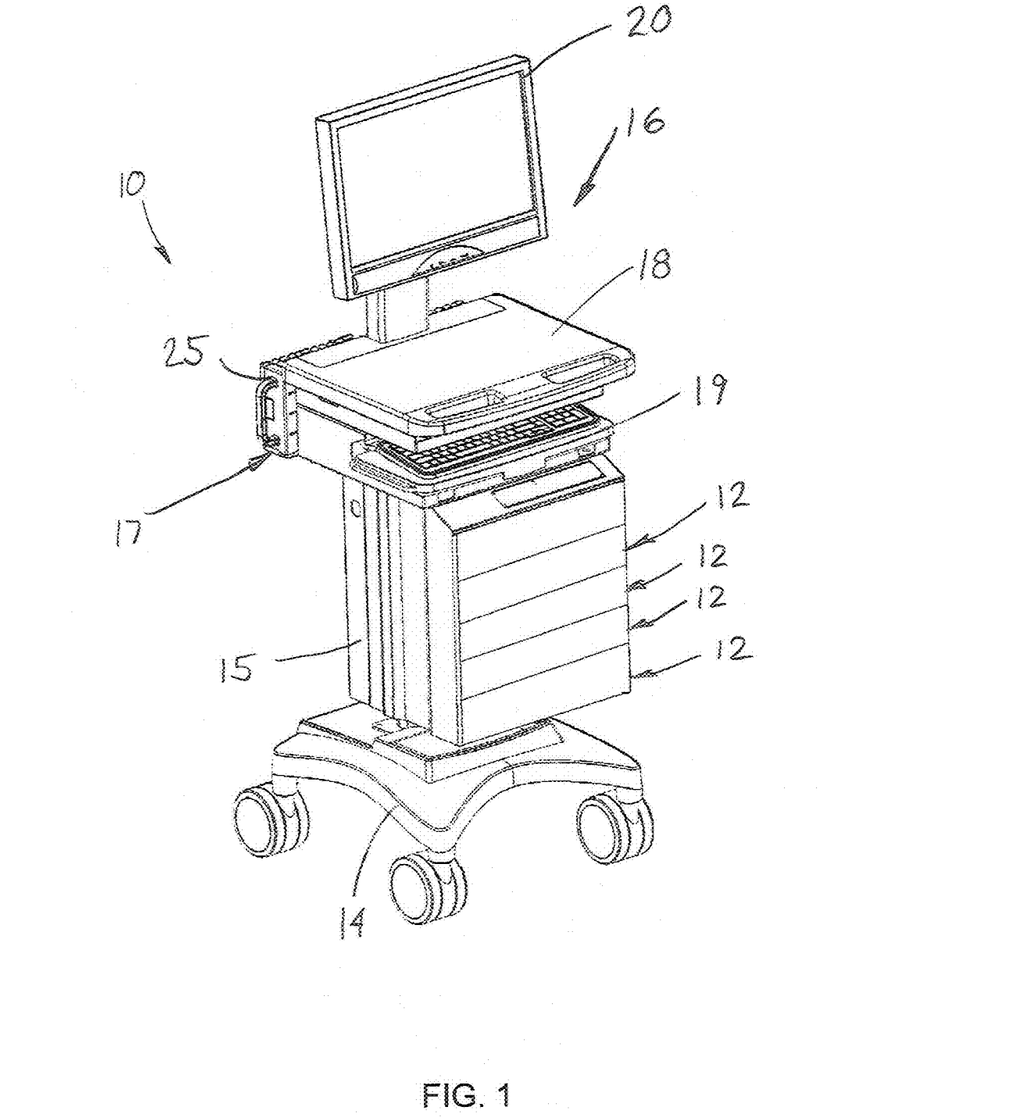
FIG. 1 is a perspective view of a mobile cart for healthcare or other non-medical environments.
Figure 2:
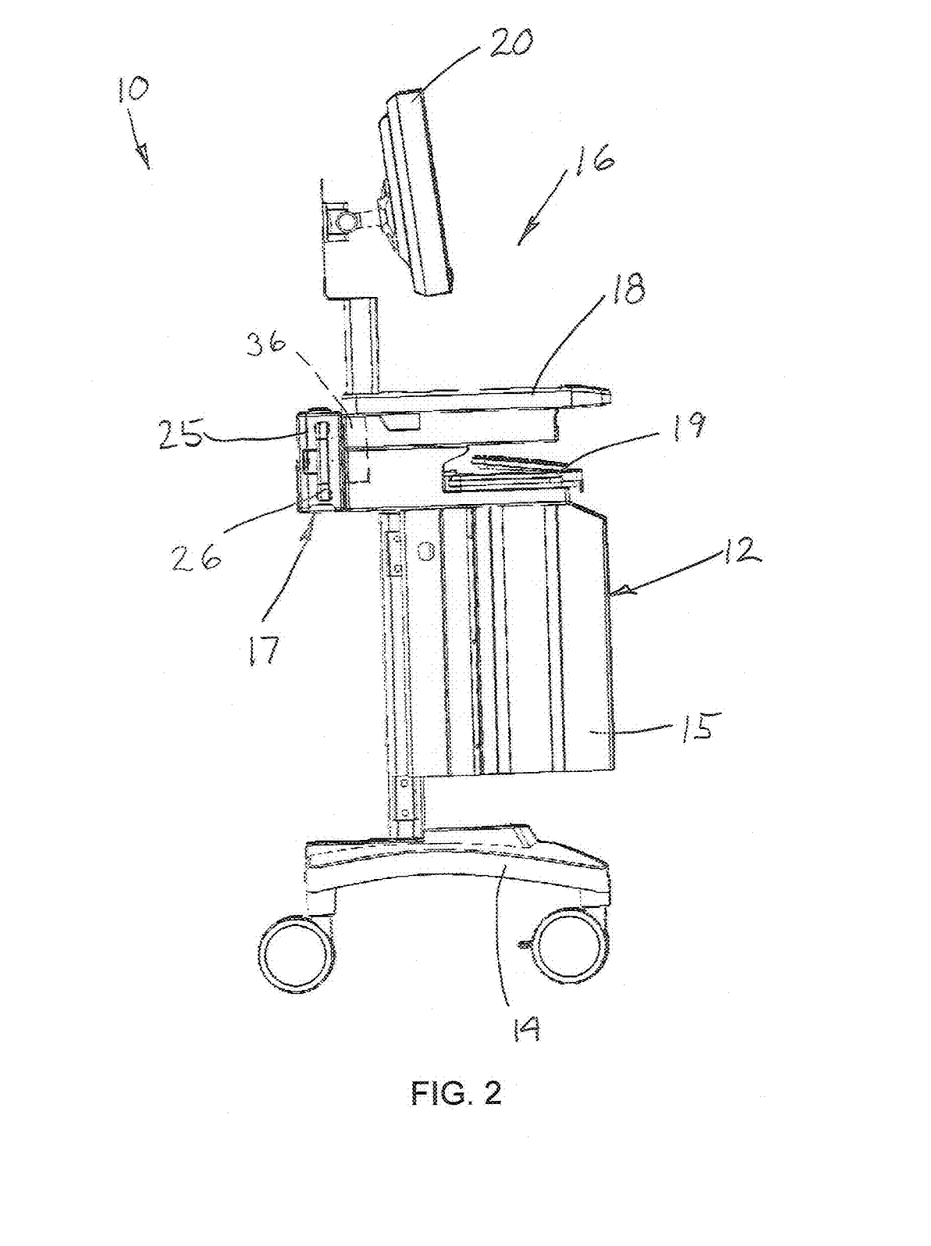
FIG. 2 is the side view thereof.

Referring to FIGS. 1 and 2, the invention relates to a mobile cart 10, which can be used in a hospital or other healthcare facility to provide care to patients, or can be used in other non-medical environments to provide mobile access to powered equipment of various types. In one exemplary configuration, the mobile cart 10 is provided with several drawers 12, which can be each configured to hold patient medications or other medical supplies. The contents of the drawers 12 can be assigned to one patient or assigned to multiple patients.

Generally, the mobile cart 10 includes a base 14, a housing 15 that slidably supports the drawers 12 within the interior compartment thereof, a computerized control system 16 that is powered by a battery assembly 17, and a worksurface 18. The control system 16 includes a keyboard or other input device 19 and a signal panel or display 20. The signal panel 20 is operatively connected to the computerized control system so as to display information and if a touch screen, to also serve as another input device. The computerized control system 16 represents one example of powered equipment, and it will be understood that other equipment can be provided, which is powered by either DC or AC power.

The invention relates to an improved battery assembly 10, which is provided in a removable battery configuration and includes an inventive charging system for selective battery charging and discharge.

Figure 3:
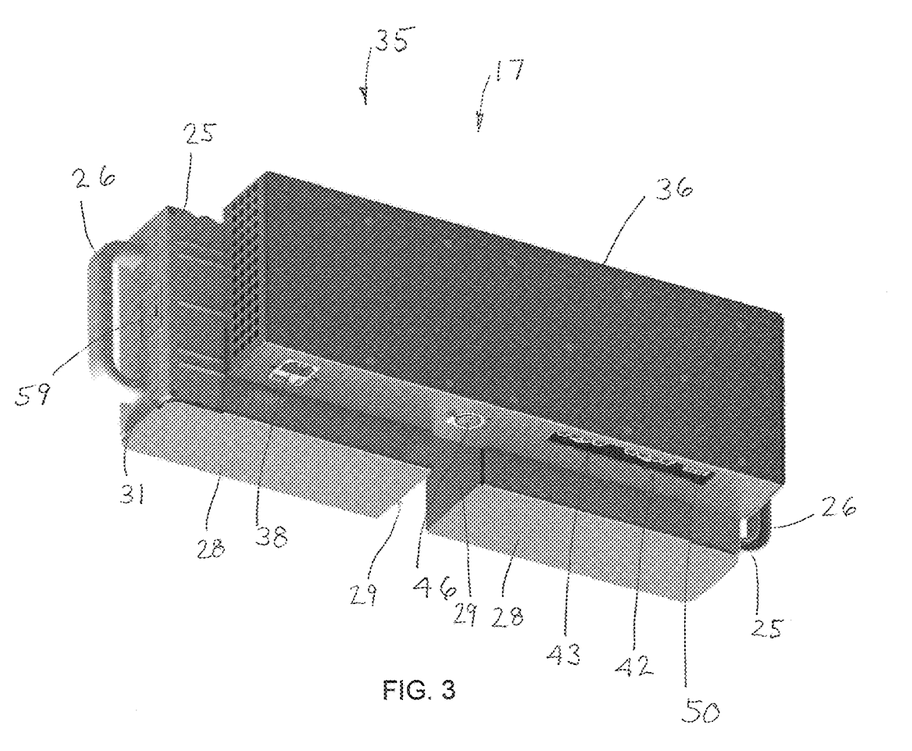
FIG. 3 is a front perspective view of a battery assembly as viewed from below.
Figure 4:
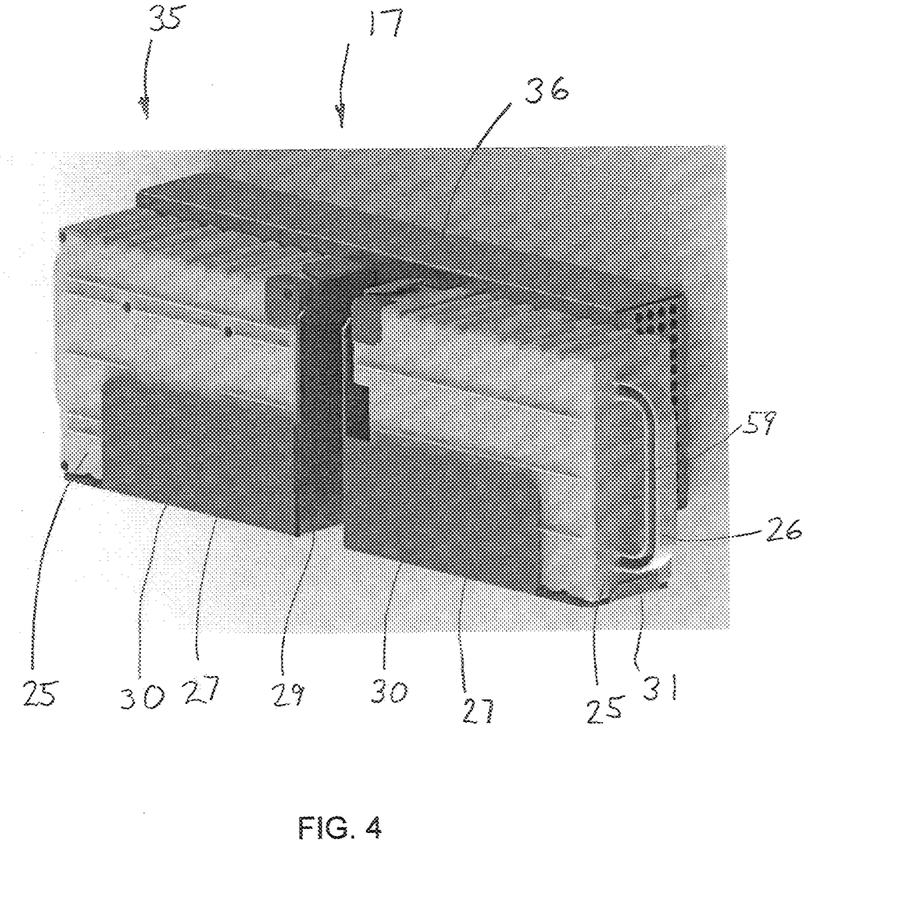
FIG. 4 is a rear perspective view of the battery assembly.

Referring to FIGS. 2, 3 and 4, the battery assembly 17 includes one or more removable batteries 25, which each include respective handles 26 for manual handling of the batteries 25 during removal and installation on the cart.

Figure 6:
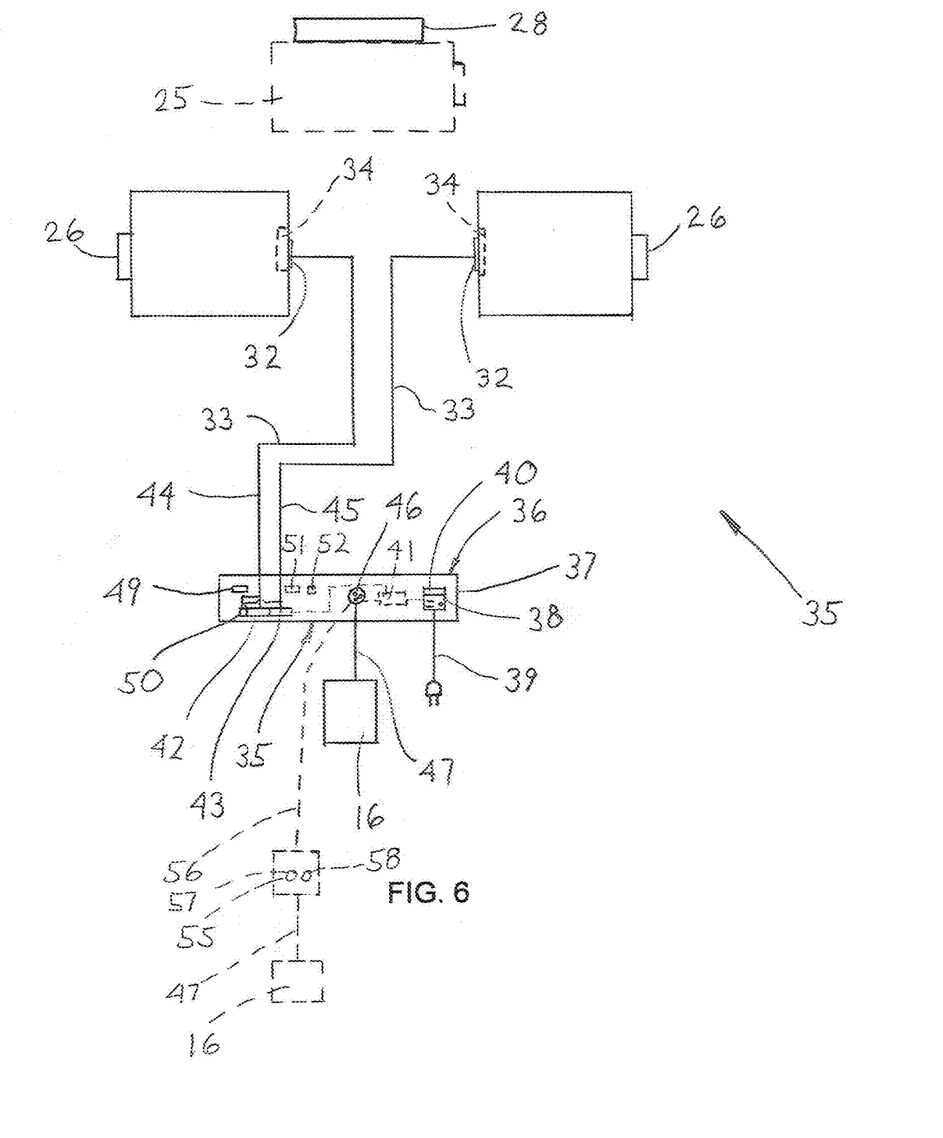
FIG. 6 is a diagrammatic view of the BCS.

The battery assembly 17 includes a pair of rigid battery supports or holsters 27, which define sockets in which the individual batteries may be received. In particular, the battery supports 27 are formed by a bottom panel 28, end walls 29, and side walls 30, which allow the battery to be slid sidewardly into the pocket formed therein. End flanges 31 generally are provided to prevent the battery from sliding out of the supports 27 after installation or docking therein. Notably, each battery 25 is separately supported within its own respective battery support 27, which allows each battery 25 to be installed, one at a time, and also to be removed individually while the other battery 25 remains in position on the cart 10. On the end face of the battery 25, opposite the handle 26, an electrical connector 32 (FIG. 6) is provided, which is disposed near the end walls 29 when mounted on the cart 10. The electrical connector 32 allows for the connection of an electrical cable 33 thereto by a suitable cable connector, which removably plugs to the connector 32 as seen in FIG. 6.

As illustrated, the battery assembly 17 is provided with two battery supports 27, which can support one or more batteries thereon. It will be understood that one battery support 27 might be omitted in an alternative design wherein only one battery 25 is provided on the cart 10 for charging and discharging in accord with the invention.

More particularly, each battery 25 is an array of interconnected battery cells, which are provided with safety controls, and interconnects. Preferably, each battery 25 is a lithium ion battery having particular charging characteristics. It will be understood that other types of batteries can be provided which might have a different battery chemistry and different charging characteristics.

Each battery 25 preferably includes internal data storage 34 such as that provided by a printed circuit board and RAM. This internal battery storage 34 is interconnected with the connector 32 and cells to monitor and collect data on various system parameters. For example, the battery data storage 34 can detect the presence of a short, the battery temperature and the like, and can store internally a history of times and dates of charging and discharging activities, as well as the number of charge cycles. In the present invention, a charge cycle is counted as the number of times a battery is charged by an amount equal to a full charge. For a fully discharged battery 25, which is recharged to 100% charge, a single charge might count as one charge cycle. For a partially discharged battery, several recharges of the battery 25 might equal a single charge cycle.

Figure 5:
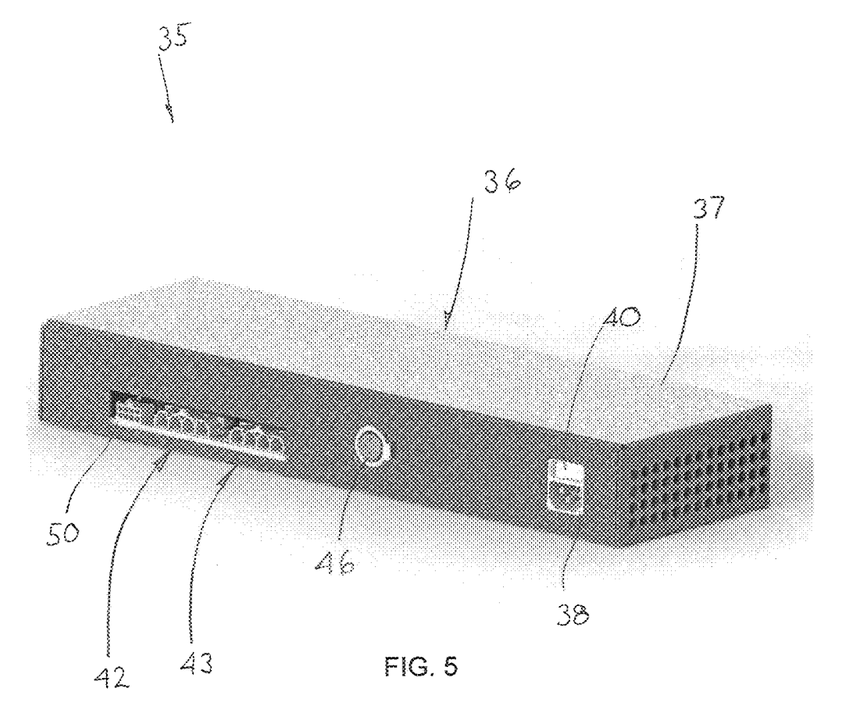
FIG. 5 is a side perspective view of a battery control system (BCS).

Referring to FIGS. 3-5, the battery assembly 17 also includes a battery control system (BCS) 35, which BCS 35 includes a box like control unit 36. The BCS 35 is an intelligent control system for recharging the removable batteries 25 and the battery cell packs contained within the batteries 25. Generally, the BCS 35 is developed to permit charging of the batteries 25 while still seated within the battery supports 27 as illustrated and to also permit one of the batteries 25 to be removed from the cart 10 for recharging at a wall-mounted remote charging station 28 (FIG. 6). Since one battery 25 remains on the cart 10 to provide continuous power to the electrical equipment, the BCS 35 allows the second battery 25 to be independently removed and swapped out with another battery 25 if desired. In other words, each battery 25 is "hot-swappable" without affecting the operation of the cart 10. The BCS 35 is in removably connectable to the batteries 25 to control charging and discharging of battery power, and also communicates with the batteries 25 to provide an improved system and method of using the batteries 25.

In more detail, FIGS. 5 and 6 illustrate the BCS 35 separately (FIG. 5) and having the batteries 25 connected to the control unit 36 in an exemplary configuration (FIG. 6). The control unit 36 includes an external housing 37, which contains various components therein. First, the control unit 36 includes an internal AC/DC power supply, which connects to an AC electrical plug 38 on the exterior of the housing 37. This plug 38 in turn can removably connect to a power cord 39, wherein the free, end of the power cord 39 has a wall-engagable plug that can be plugged into any conventional wall outlet, to provide power to the control unit 36. Preferably, this power supply is 120V AC power, although this can vary depending upon power needs and available power that is available in a building such as a hospital. The power supply also has an on/off switch 40 on the housing exterior. Interiorly within the housing 37, the power supply provides DC power to a charge controller 41 (FIG. 6). Generally, the charge controller 41 is a printed circuit board that terminates power and data/signal connections from one or more batteries 25 to thereby control the charging/discharging process.

In more detail, the charge controller 41 provides programmable logic, which controls the charge and discharge cycles of the battery 25, and also performs a switch function of switching the power charge/discharge cycles between the batteries 25. In particular, the charge controller 41 preferably receives DC power from the power supply and electrically connects to first and second power ports 42 and 43. This selectively provides an electrical path to the power ports 42 and 43, wherein the electrical cables 33 are plugged into the power ports 42 and 43, which in turn connect to the batteries 25 to either permit charging or discharging of such batteries 25.

The cables 33 include a first cable 44, which connects to a first battery 25, and include a second cable 45, which connects to the second battery 25. Depending upon the operational state of the charge controller 41, the cables 44 and 45 can either supply power to the batteries 25 one at a time, or conversely, permit discharge of battery power in order to power the mobile cart 10. In addition, the cables 44 and 45 may include a data carrying capability, which allows for the communication of battery data between the internal battery data storage 34 and the charge controller 41 as will be described further herein.

Next, the charge controller 41 also includes a power output, which supplies DC power to an output port 46. The output port 46 can have an electrical cable 47 plugged therein which supplies power to the computerized control system 16 on the cart 10. Hence, when the charge controller 41 is switched to a discharging condition, the battery power is provided through one or the other cable 44 or 45 to the charge controller 41 and in turn is supplied to the output port 46 to thereby supply power to the cart's control system 16. As will be described further herein, the charge controller 41 also might be switched to a charging condition, which supplies power to one output port 42 or 43 or the other for charging the batteries 25, while also supplying power from the power input 38 to the output port 46 to power the cart 10.

If desired, the charge controller 41 could include an optional USB data port 49, which in turn could connect to the control device 16 by a data cable to allow the communication of data between the charge controller 41 and the control device 16. For example, the cart 10 may have a PC with appropriate software that would allow the display of battery charging information on the display 20. Further, the charge controller 41 could respond to instructions received from the control device 16.

Additionally, a signal port 50 is provided with the power ports 42 and 43 so as to permit data communication between the charge controller 41 and the internal data storage 34 on the batteries 25. A data connector may be provided on the cables 44 and 45, which connects data signal lines in the cables 44 and 45 with the internal battery storage 34.

Another data port 51 can also be provided on the control unit 36, which data port 51 is in data communication with the charge controller 41 can be cable connected to external status indicators on the cart. For example, the control board can provide for a State of Charge display via signal port 51. Charge status is communicated by this port 51 via I2C signal and may be displayed as one or more light displays elsewhere on the cart 10. As such, the state of charge data can be received from the batteries or determined by the charge controller 41 during charging and then the charge controller 41 would provide appropriate signals through the data port 51 to the light display or other appropriate indicator.

Still further, a data port 52 may be provided which is connected to the charge controller 41 to receive a signal that a particular amount of discharge time is left on each battery 25. This data port 52 may be cable connected to an alert light provided elsewhere on the cart 10.

Accordingly, the charge controller 41 is switchable between several charge and discharge conditions, wherein switching is controlled by the controller logic stored therein. In one condition, "shore power" or external power may be provided to the control unit 16, which occurs when the power cord 39 is plugged into the wall outlet. This supplies AC power to the BCS control unit 36, which converts this line power to DC power, which can then be selectively routed to either battery 25 for charging, and routed to the power outlet 46 for continuously powering the cart control device 16 and any other cart-mounted equipment.

While power outlet 46 is configured for DC power that is supplied from the charge controller 41, the control unit 16 may optionally include an inverter to convert the power back to AC power, if such AC power is needed for cart equipment instead of DC power. The inverter may be simply installed within the housing 37. More preferably, an inverter 55 might be mounted exteriorly on the housing 37 in an alternate configuration diagrammatically shown in FIG. 6 in phantom outline. The inverter 55 can be mounted on the housing 37 and would include a DC plug and power line 56, which plugs into the outlet 46 to receive DC power and then convert this power to AC power for use by the cart 10. If desired, the inverter could only have an AC power outlet 57, or could alternatively have both an AC power outlet 57 and a DC power outlet 58 in combination to provide power to the equipment 16 through power cord 47. If equipment 16 requires AC power, cord 47 could connect to AC outlet 47 or if DC powered, equipment 16 could have the cord 47 connected to DC outlet 48.

Alternatively as to operation of the charge controller 41, shore or external power may not be present, which occurs when the power cord 39 is unplugged and the mobile cart 10 is in use at a remote location removed from external power. When external power is not present, the charge controller 41 switches so as to receive power from one battery 25 or the other and route this battery power to the outlet port 46 for powering the cart 10. Here again, an inverter could also convert the DC battery power to AC power for use on the cart 10.

If the one battery 25 runs low on power, the charge controller 41 switches from the one discharged battery 25 to the other charged battery 25. Also, if one battery 25 is manually removed from the cart 10, the charge controller 41 automatically detects removal of this battery 25. If this removed battery 25 was being used for cart power, the charge controller 41 automatically and quickly cuts over to the other remaining battery 25 so that power continues to be supplied to the cart without interruption. This is referred to as hot swapping of the batteries 25. In this regard, the charge controller 41 may use a MOSFET electronic switch for this purpose.

With this design, the batteries 25 are capable of being removed from their supports 27 for charging off the cart via a stationary charger 28 and capable of being charged on the cart via the BCS 35 built into the cart 10.

As such, the cart 10 may be operated with one or two batteries 25 installed in the two available battery supports 27. Alternatively, only a single battery support 27 might be provided for mounting a single respective battery 25 which charges and discharges in response to the charge controller 41. If no batteries 25 are present or both batteries 25 are discharged or dead, but shore power is provided, the charge controller 41 can route this line power to the cart 10 for powering of the cart 10 from the wall outlet.

More particularly, the BCS 35 and the charge controller 41 thereof implements an inventive charging and discharging method, which provides improved charging and operation of the batteries 25.

In use, the BCS 35 determines if a power supply is present through the power cord 39. Upon detecting the supply of this line power, the BCS 35 uses that power to power the cart 10, and then determines if either battery 25 needs to be charged. This is a first priority for power usage.

As a second priority if shore power is not present, the BCS 35 and its charge controller 41 determines which battery 25 to use. Notably, the BCS 35 preferably does not run the battery power to 0% but instead considers a battery 25 to be discharged or dead if the battery power is measured by the charge controller 41 as being less than some minimum threshold which can be dictated by the particular battery construction and battery chemistry. Some battery chemistries may have a lower minimum threshold while other battery chemistries may have a higher minimum threshold. This is the minimum battery charge. The charge controller 41 is connected to both batteries 25 through the cables 44 and 45 and can detect battery charge through various methods such as battery resistance or other known methods.

If one battery is at or below the minimum charge, then the charge controller 41 would run on or use the other battery 25 having the higher battery charge above the minimum charge.

If both batteries 25 are above the minimum charge, the BCS 35 then uses the battery with the lower state of charge. For example, a battery 25 with 20% charge would be used before a battery 25 with 30%. This ensures that the reserve power provided by the other battery 25 has the highest power while the one battery 25 is being used to power the cart 10.

The battery 25 in use will continue to be used until its charge decreases to the minimum threshold, at which time the charge controller 41 will switch to the other reserve battery 25. The charge controller 41 might also notify the operator that one battery is now dead or discharged through use of a warning light which is provided on the BCS 35 or alternatively, through data signals sent to the display 20 through optional USB output port 49. For example, the BCS 35 may report the level of charge to an on-board computer 16. If the on-board computer operates under various known operating systems, the BCS 35 can communicate charge status to the user via the standard power icon found on typical operating systems. Also, the battery charge can be communicated through signal port 51 to a light display and when 1 hour of charge is left, this information can be communicated to an alert light through port 52. Still further, each battery 25 might have an optional display panel 59 (FIGS. 3 and 4) on the end face, which provides a visual indication of the battery charge and any other suitable information.

Next as to the charging sequence or method, the charge history and other logged events are available to the BCS 35 from the internal battery storage 34. This information also includes the total number of charge cycles for each battery 25.

If shore power is attached for charging, the BCS 35 is designed to minimize the overall charge time necessary to charge the batteries 25 to adequate levels. Generally, the BCS 35 gives priority to charging each battery 25 to 80% of total battery capacity, which can be done quickest. The remaining 20% of charge typically is a longer process due to the charging characteristics of these types of batteries 25. In other words, the charge characteristics of a battery 25 are different below 80% in comparison to charging the remaining 20% above 80% to reach a 100% or full charge.

More particularly, when charging, the battery 25 with the higher state of charge is charged first, provided its charge level is not more than upper charging threshold and the other battery (A) is less than this charging threshold. Essentially, one characteristic of rechargeable batteries is that a battery 25 can recharge quickly up to an upper charging threshold less than 100%, at which threshold, the rate of charging slows. This upper charging threshold is dictated by the battery design and chemistry. To provide an efficient charge time, the inventive BCS 35 is able to quickly charge each battery 25 in the charging range below the upper charging threshold, and then subsequently tops off or completes charging above the charging threshold after both batteries 25 have reached this upper charging threshold.

When the battery 25 that is being charged reaches the upper charging threshold of for example, 80%, the charge controller 41 then cuts over to the other battery and charges it to the upper charging threshold, if needed. After both batteries are have been charged to their upper charging threshold, the charge controller 41 will continue to charge the one battery 25 to a full charge, such as 100%, and then charges the other battery 25 from the upper charging threshold to a full charge; for example, from 80% to 100%. In performing this charging sequence, the BCS 35 may charge quickly using a constant charging current up to the upper charging threshold for each battery 25, and then use a constant voltage to charge to 100%, which occurs at a slower rate. This ensures that both batteries 25 can reach a significant charge in a relatively short period of time, and then if time allows, each battery 25 can be topped off to its full charge.

While the above-described charging and discharging preferences are used, there is a preferred exception. In this regard, the charge controller 41 initially receives data on the cycle count or total count of charge cycles for each battery 25 from the battery storage 34, and then compares the cycle counts for the two batteries 25. This preferably occurs at the time that shore power is connected or appears. In the event the cycle count of one battery 25 exceeds the cycle count of the other battery 25 by a defined cycle differential, for example, a cycle of differential of more than 800 cycles, then the battery 25 with the lower cycle count is used first in both discharge and recharge. This exception extends and equalizes the service life of a group of batteries.

While one or both batteries 25 are being charged, the BCS 35 also supplies power to the cart's electrical devices.

Also, the charge controller 41 may communicate other information for use by a cart operator. For example, upon insertion of a battery 25, the BCS 35 may send a message to the on-board computer through data line 50, giving the charge status and identity of the just-inserted battery 25. Further, the charge controller 41 can provide for the alert light, visible to the cart user, which indicates when the batteries 25 on board have less than approximately one hour of use time remaining.

In another aspect of the invention, the BCS 35 also also permits the system to operate efficiently with two assigned batteries 25, one on board in the battery support 27 and one on the wall-mounted charger or charging station 28. While BCS 35 is attached to a wall outlet, power is supplied to the BCS 35 and any battery 25 on board will charge up to the capacity of each. A swap can be performed by first attaching the power cord 39 to the wall outlet, then swapping the batteries 25 between the battery supports 27 and the charging station 28. Notably, the charging station 28 can be designed with the same BCS 35 so that the same charging logic is used at station 28 in the event such charging station 28 is able to charge multiple batteries 25.

In the above described arrangement, a single charge controller 41 can be provided on the circuit board to implement the above logic and charge the batteries 25 one at a time. It also will be understood that the control unit 16 may include two charge controllers 41 on the circuit board, which provides the option of charging two batteries 25 simultaneously. In this regard, the charge controllers 41 might first determine if the cart equipment is in use or drawing power from the power outlet 46. For example, if the cart 10 is off and no or very little power is being drawn from the charge controllers 41 by the cart equipment, both charge controllers 41 could then operate to charge the batteries 25 simultaneously. The power supply for the control unit 16 would be rated to supply adequate power for simultaneous battery charging. If the equipment on the cart 10 was turned on or drawing more significant power, the charge controllers 41 could then coordinate with each other to charge only one battery 25 according to the logic described above.

Although a particular preferred embodiment of the invention has been disclosed in detail for illustrative purposes, it will be recognized that variations or modifications of the disclosed apparatus, including the rearrangement of parts, lie within the scope of the present invention.

I claim:

1. A power system for mobile cart, comprising:
a battery assembly comprising a plurality of rechargeable batteries, a battery support for supporting each respective one of said batteries wherein said battery support is mountable on a mobile cart and said respective battery is removeably engageable with and disengagable from said battery support from an exterior of said battery support, said battery assembly including a battery connector for each said battery which is engageable with said battery when said battery is installed on said respective battery support, each said battery being individually removable from said battery support independently of any other said battery supported by said battery support to supply power through said battery connector;

a battery control system for controlling discharge of said batteries, which has a control unit comprising a controller connected to said battery connector for controlling battery discharge, a power outlet receiving power under the control of said controller and supplying said power to electrical equipment on a mobile cart, wherein discharging of said battery supplies battery power to said power outlet; and said controller having a switch that selectively controls which said battery is being discharged to supply said battery power to said power outlet, and said controller communicating with and monitoring a battery charge of each said battery, said controller switching from a first said battery to a second said battery when said battery charge is at a minimum charge or said first battery is removed from said battery support, wherein when external power is not present or has been removed, said controller determines which said battery to use, wherein said controller monitors if said battery charge of each said battery is below a minimum charge which establishes that a battery is discharged, said controller first using said battery which is above said minimum charge and has the lowest battery charge relative to each other said battery to supply said battery power to said power outlet.

2. The power system for a mobile cart according to claim 1, wherein said controller determines if external power is present, wherein external power is used to supply power to said power outlet.

3. The power system for a mobile cart according to claim 1, wherein when said controller determines one said battery is at or below said minimum charge, then said controller uses another said battery having a battery charge above the minimum charge to supply said battery power to said power outlet.

4. The power system for a mobile cart according to claim 1, wherein when controller determines said first and second batteries are above said minimum charge, said controller using said battery with a lower battery charge to supply said battery power to said power outlet.

5. The power system for a mobile cart according to claim 4, wherein said battery in use will continue to be used to supply said battery power to said power outlet until its battery charge decreases to said minimum charge, at which time said controller switches to another said battery to supply said battery power to said power outlet.

6. The power system for a mobile cart according to claim 5, wherein said controller monitors a cycle count of the number of charge cycles for each said battery and determines a cycle differential between said cycle counts of said batteries, said controller determining which said battery to use based upon said battery charge, said cycle count of each said battery and said cycle differential, wherein said controller determines when said battery charge of each said battery is below said minimum charge which establishes that said battery is discharged, said controller first using said battery which is above said minimum charge and has the lowest battery charge to supply said battery power to said power outlet unless said cycle count exceeds said defined cycle differential wherein said controller first uses said battery which has a lowest said cycle count to reduce said cycle differential.

7. The power system for a mobile cart according to claim 6, wherein each said battery includes internal data storage which interconnects with said controller and stores data associated with battery parameters of said batteries.

8. The power system for a mobile cart according to claim 7, wherein said battery parameters stored on said internal data storage include said cycle count, wherein said cycle count is updated each time said battery is recharged.

9. The power system for a mobile cart according to claim 1, wherein said controller initially receives data on a cycle count for each said battery from a data storage associated with said battery, and then compares said cycle count for each said battery, and when said cycle count of a first said battery exceeds said cycle count of a second said battery by more than a defined cycle differential, then said battery with said lower cycle count is used first to supply power to said power outlet until said battery charge is less than said minimum charge.

10. The power system for a mobile cart according to claim 1, wherein said power system comprises an inverter connected to said power outlet which converts said battery power from DC power to AC power, wherein AC power is supplied from said power outlet to electrical equipment on said mobile cart.

11. The power system for a mobile cart according to claim 1, wherein said controller communicates with a notification unit to notify a user of a charge status of each said battery.

12. A power system for a mobile cart, comprising:

a battery assembly comprising a plurality of rechargeable batteries, a battery support for supporting each respective one of said batteries wherein said battery support is mountable on a mobile cart and said respective battery is removeably engageable with and disengagable from said battery support, said battery assembly including a battery connector for each said battery which is engageable with said battery when said battery is installed on said respective battery support, each said battery being individually removable from said battery support independently of any other said battery supported by said battery support such that any other said battery remaining on said battery support to supply power through said battery connector;

a power supply which is removably connectable to external power and which provides power to said power system when each said battery is removed or is discharged to a battery charge below a minimum charge;

a battery control system for controlling discharge of said batteries, which has a control unit comprising a controller connected to said battery connector for controlling battery discharge, a power outlet receiving power under the control of said controller from said power supply or from one said battery and supplying outlet power to electrical equipment connected thereto, wherein discharging of said battery supplies said battery power to said power outlet; and said controller having a switch that selectively controls which said battery is being discharged to supply said battery power to said power outlet, and said controller communicating with and monitoring said battery charge of each said battery and the presence of each said battery on said mobile cart, said controller discontinuing use of a first said battery when said battery charge drops below said minimum charge or said first battery is removed, and said controller switching to either a second said battery, or else to said power supply if each said battery is below said minimum charge or each said battery is removed from said respective battery support, said controller determining which said battery to use, wherein said controller determines when said battery charge of each said battery is below said minimum charge which establishes that said battery is discharged, further said controller first using said battery which is above said minimum charge and has the lowest battery charge to supply said battery power to said power outlet.

13. The power system for a mobile cart according to claim 12, wherein said power supply is supplied by external power disposed external to said mobile cart.

14. The power system for a mobile cart according to claim 12, wherein when one said battery is at or below said minimum charge, then said controller uses another said battery having said battery charge above said minimum charge to supply power to said power outlet.

15. The power system for a mobile cart according to claim 14, wherein when said first and second batteries are above said minimum charge, said charge controller first using said battery with a lower battery charge to supply said battery power to said power outlet.

16. The power system for a mobile cart according to claim 12, wherein said controller monitors a cycle count of the number of charge cycles for each said battery and determines a cycle differential between said cycle counts of said batteries, said controller determining which said battery to use based upon said battery charge, said cycle count of each said battery and said cycle differential, wherein said controller determines when said battery charge of each said battery is below said minimum charge which establishes that said battery is discharged, said controller first using said battery which is above said minimum charge and has the lowest battery charge to supply said battery power to said power outlet unless said cycle count exceeds a defined cycle differential wherein said controller first uses said battery which has a lowest said cycle count to reduce said cycle differential.

17. The power system for a mobile cart according to claim 12, wherein said power system comprises an inverter connected to said power outlet which converts said battery power from DC power to AC power, wherein AC power is supplied from said power outlet to electrical equipment on said mobile cart.

18. The power system for a mobile cart according to claim 12, wherein when each said battery is manually removed from said battery support during discharging, said controller automatically detecting removal of said battery and switching discharging to said power supply.

\* \* \* \* \*

UNITED STATES PATENT AND TRADEMARK OFFICE
CERTIFICATE OF CORRECTION

PATENT NO.       : 10,367,373 B2
APPLICATION NO.  : 15/205677
DATED            : July 30, 2019
INVENTOR(S)      : James S. Boyd It is certified that error appears in the above-identified patent and that said Letters Patent is hereby corrected as shown below:

On the Title Page

Item (63) should read:
(63) Continuation of application No. 13/872,640, filed on Apr. 29, 2013

Item (60) insert:
--(60) Provisional application No. 61/639,283, filed on Apr. 27, 2012--

Signed and Sealed this
Fourteenth Day of February, 2023

Katherine Kelly Vidal
*Director of the United States Patent and Trademark Office*